United States Patent [19]

Toohey

[11] 4,439,664

[45] Mar. 27, 1984

[54] WELDING APPARATUS WHEREIN PHYSICAL CONTACT OF WELDING ELECTRODE WITH WORKPIECE IS MECHANICALLY SENSED

[75] Inventor: William J. Toohey, San Diego, Calif.

[73] Assignee: Jetline Engineering, Inc., Irvine, Calif.

[21] Appl. No.: 372,193

[22] Filed: Apr. 26, 1982

[51] Int. Cl.³ .............................................. B23K 9/12
[52] U.S. Cl. .......................... 219/124.02; 219/124.34
[58] Field of Search ...................... 219/124.03, 124.02, 219/124.34

[56] References Cited

U.S. PATENT DOCUMENTS 4,284,871 8/1981 Mawson et al. ................ 219/124.02

FOREIGN PATENT DOCUMENTS 219039 9/1968 U.S.S.R. ........................ 219/124.03

*Primary Examiner*—C. C. Shaw
*Attorney, Agent, or Firm*—Jackson, Jones & Price

[57] ABSTRACT

An improved welding apparatus having an electric motor driven electrode carriage assembly, is disclosed. The carriage assembly is capable of carrying the electrode either towards or away from a workpiece depending upon the direction of rotation of the electric motor. An electric switch and a control unit is operatively associated with the electrode carriage assembly for the switch to be tripped when the electrode in its movement toward the workpiece physically contacts the workpiece. Tripping of the switch sends an appropriate signal to the control unit to reverse rotation of the electric motor for a predetermined time period whereby the electrode is carried to a predetermined distance from the workpiece.

21 Claims, 8 Drawing Figures

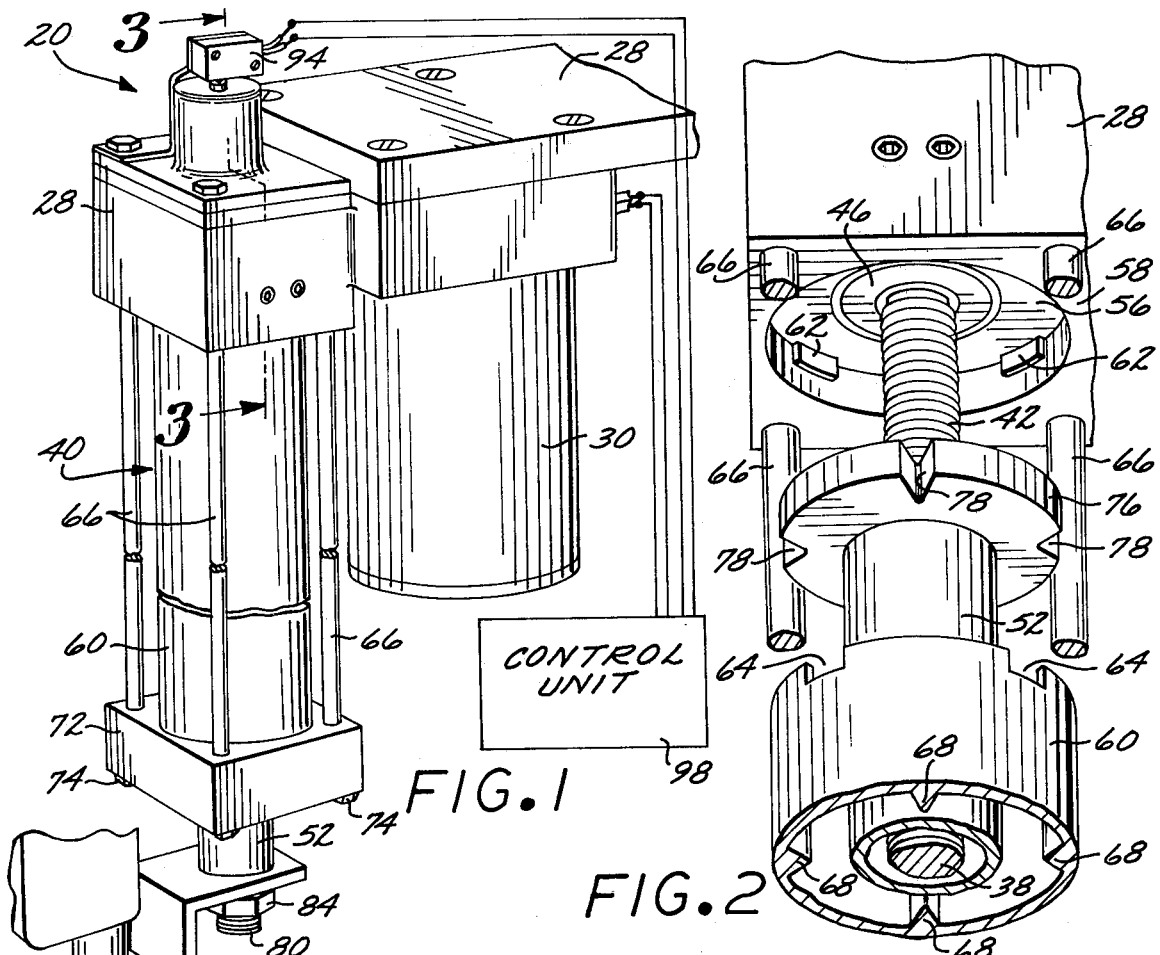
FIG. 1
FIG. 2
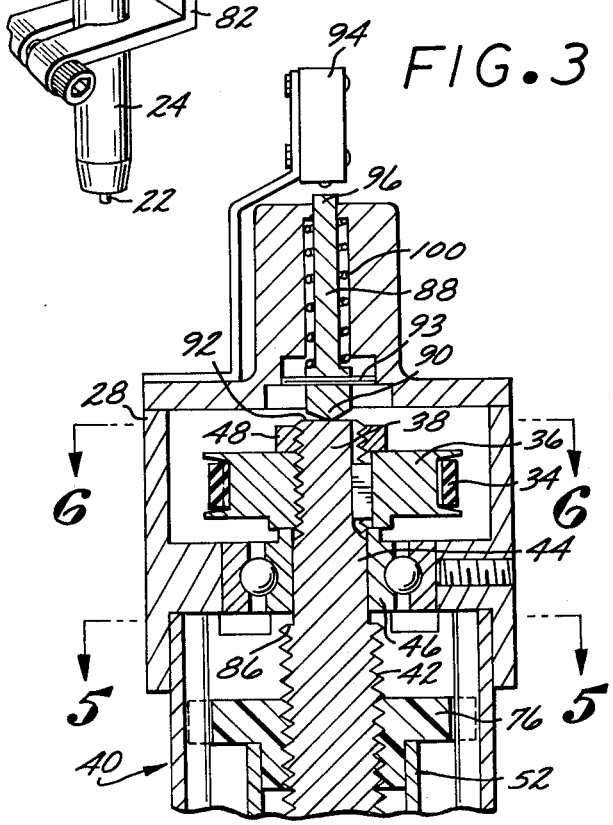
FIG. 3
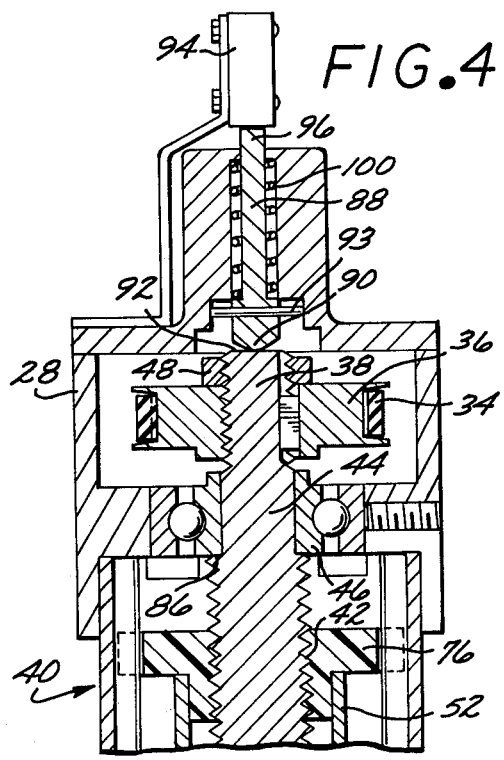
FIG. 4

WELDING APPARATUS WHEREIN PHYSICAL CONTACT OF WELDING ELECTRODE WITH WORKPIECE IS MECHANICALLY SENSED

BACKGROUND OF THE INVENTION

1. Field of the Invention

The present invention is directed to an arc welding apparatus. More particularly, the present invention is directed to an improved arc welding apparatus wherein physical contact of a welding electrode with a work surface is mechanically sensed, and the electrode is carried to a predetermined distance away from the work surface after the physical contact is made.

2. Brief Description of the Prior Art

Arc welding apparatus are well known in the prior art. As is well appreciated by those skilled in the art, during a welding operation the welding electrode must be at a predetermined distance from the work surface. This distance is usually determined principally on the basis of the nature of the electrode, the workpiece, the intensity of the electric arc employed for the welding, and the nature of the desired weld.

In order to position the electrode at the desired predetermined distance from the work surface (set in advance by an operator), welding apparatus of the prior art usually employ a lead screw actuated mounting assembly or carriage for the electrode. The lead screw is rotated by an electric motor and, depending on the direction of rotation of the motor, a threaded sleeve mounted to the lead screw carries the electrode towards or away from the work surface.

Because it is important to establish a reference point regarding the location of the electrode relative to the workpiece, the electrical resistance or impedance between the electrode and the workpiece is monitored in the prior art. The electrode is considered to be at zero distance from the workpiece when the monitored resistance or impedance falls below a predetermined threshold value. When this occurs, an electronic control unit causes the electric motor to reverse to carry the electrode away from the workpiece to a predetermined distance. As is known to those skilled in the art, the welding arc is usually initiated when the electrode is disposed at the predetermined distance from the work surface.

Although ideally, the above-summarized prior art welding apparatus should work reliably, in practice its operation is far from optimal. The principal cause for errors and unreliability of operation lies in the fact that a relatively large electric resistance or impedance may exist between the electrode and the workpiece in spite of the fact that the electrode physically touches the workpiece. For example, a corroded, rusty, or otherwise coated or unclean metal surface of the workpiece may offer an electrical resistance or impedance which is significantly higher than the threshold value. In this case the prior art welding apparatus does not "sense" that physical contact has been made between the electrode and the workpiece, and the motor driven lead screw assembly may continue to attempt to drive the electrode further into the workpiece. At the least, in the situation described above, the ability of the prior art welding apparatus for sensing contact between the electrode and the workpiece is seriously impaired.

Alternatively, in some welding apparatus of the prior art a welding power supply of low resistance is already connected to the electrode and the workpiece. In such a case the measured resistance or impedance between the electrode and the workpiece may fall below the threshold value even though the electrode does not physically contact the workpiece.

Accordingly, there is a need in the prior art for a welding apparatus having improved ability to sense the physical contact between the electrode and the workpiece. The present invention provides such an improved welding apparatus.

SUMMARY OF THE INVENTION

It is an object of the present invention to provide a welding apparatus wherein physical contact between a workpiece and a welding electrode is reliably and accurately sensed.

This and other objects and advantages are attained by welding apparatus including an electric motor and an electrode carrying assembly which is driven by the electric motor. The electrode carrying assembly carries the electrode either towards a workpiece or away from the workpiece, depending on the direction of rotation of the electric motor. The electrode carrying assembly is operatively associated with a mechanical sensing device including an electric switch, which is tripped substantially at the moment when, during movement of the electrode towards the workpiece, the electrode physically contacts the workpiece. Tripping off the switch reverses rotation of the electric motor to carry the electrode to a predetermined distance from the workpiece.

The features of the present invention can be best understood together with further objects and advantages by reference to the following description, taken in connection with the accompanying drawings, wherein like numerals indicate like parts.

BRIEF DESCRIPTION OF THE DRAWINGS

FIG. 1 is a perspective view of a preferred embodiment of the improved welding apparatus of the present invention, however, parts of a mounting assembly whereto the apparatus is mounted are broken away in the view;

FIG. 2 is a partial perspective view of a lead screw and sleeve assembly incorporated in the preferred embodiment;

FIG. 3 is a partial cross-section of the welding apparatus taken on lines 3,3 of FIG. 1, the view showing the welding apparatus in a first position wherein a welding electrode does not contact a workpiece;

FIG. 4 is a partial cross-section of the welding apparatus showing the welding apparatus in a second position wherein the welding electrode contacts the work surface, the cross-section being analogous to the cross-section taken on lines 3,3 of FIG. 1;

DESCRIPTION OF THE PREFERRED EMBODIMENT

Figure 5:
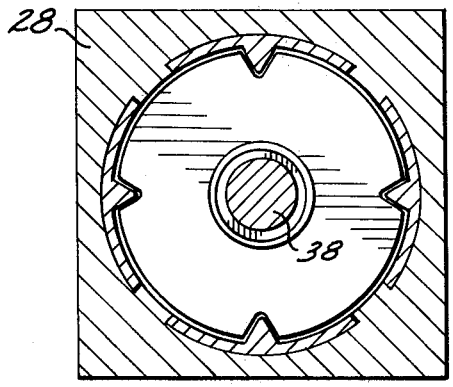
FIG. 5 is a cross-sectional view taken on lines 5,5 of FIG. 3.

The following specification taken in conjunction with the drawings sets forth the preferred embodiment of the present invention. The embodiment of the invention disclosed herein is the best mode contemplated by the inventor for carrying out his invention in a commercial environment, although it should be understood that various modifications can be accomplished within the parameters of the present invention.

Referring now to the drawing figures, and principally to the perspective view of FIG. 1, the welding apparatus 20 of the present invention is disclosed. It should be noted at the outset, that the welding apparatus 20 of the present invention incorporates certain features and components which are common with prior art welding apparatus. These features and components are described here only to the extent necessary to explain and illuminate the present invention.

Figure 8:
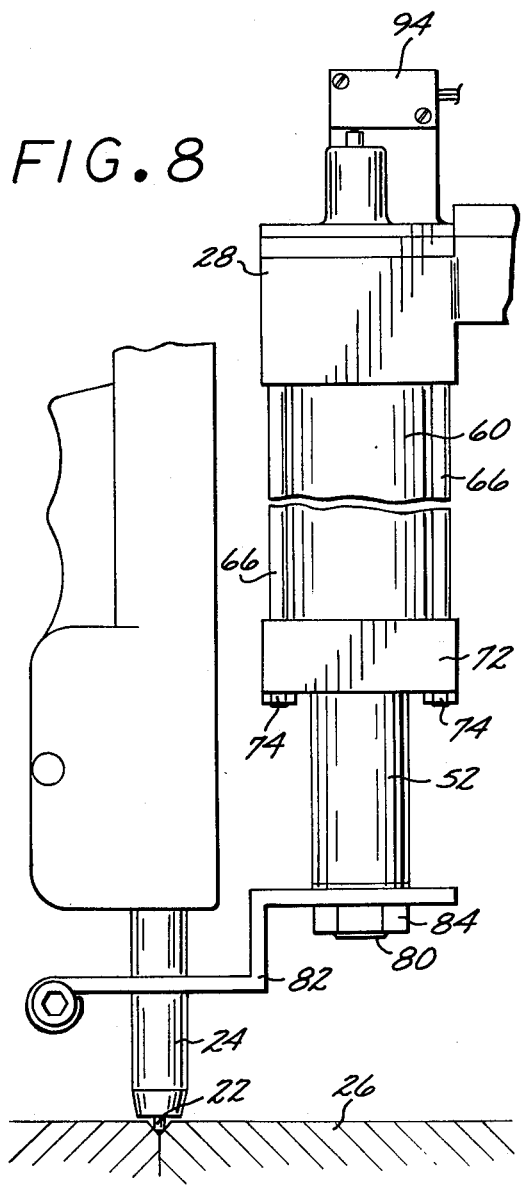
FIG. 8 is a partial side view showing the welding apparatus in the second position wherein the welding electrode contacts the workpiece.
Figure 7:
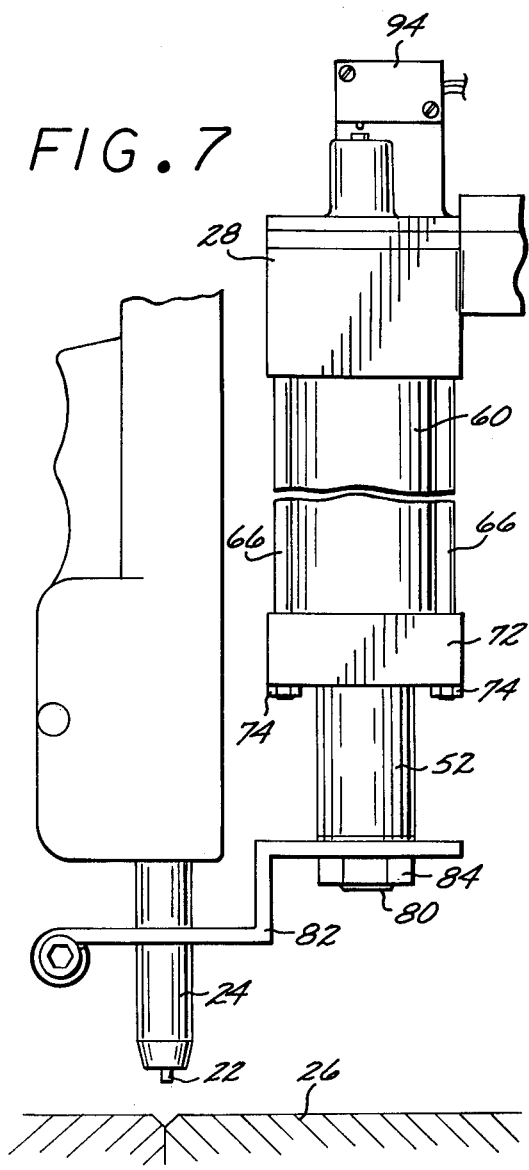
FIG. 7 is a partial side view showing the welding apparatus in the first position wherein the welding electrode does not contact the workpiece.

Thus, as it was noted briefly in the introductory section of the present application for patent, the principal function of the welding apparatus 20 is to mount a welding electrode 22, and to bring the electrode 22 into contact with a workpiece or work surface. Since the specific construction of the electrode 22 is not critical from the standpoint of the present invention, the electrode 22 including a tube 24 supplying argon or like inert gas for the welding operation, is only schematically shown on the drawing Figures. Those skilled in the art will readily recognize and appreciate that the argon supply tube 24 substantially envelopes the electrode 22 which is coaxially mounted substantially in the center of the tube 24. The workpiece or work surface is schematically shown on FIGS. 7 and 8 and bears the reference numeral 26.

After direct contact is made between the electrode 22 and the workpiece 26, the electrode 22 is withdrawn to a predetermined distance from the workpiece 26. An electric arc is initiated between the electrode 22 and the workpiece 26 when the electrode 22 has reached the predetermined distance from the workpiece 26. As is well appreciated by those skilled in the art, the contact of the electrode 22 with the workpiece 26 establishes a reference point for the measure of the predetermined distance. Therefore it is of great importance for the success of the welding operation to determine the time of contact reliably and accurately. The welding apparatus 20 of the present invention principally differs from prior art welding apparatus in the manner the contact of the electrode 22 with the workpiece 26 is sensed.

Bearing the foregoing in mind, the welding apparatus 20 is shown to include a housing 28 to which an electric motor 30 is mounted. The housing 28 is attached to a conventional welding apparatus mounting assembly which is not shown on the drawing Figures.

Figure 6:
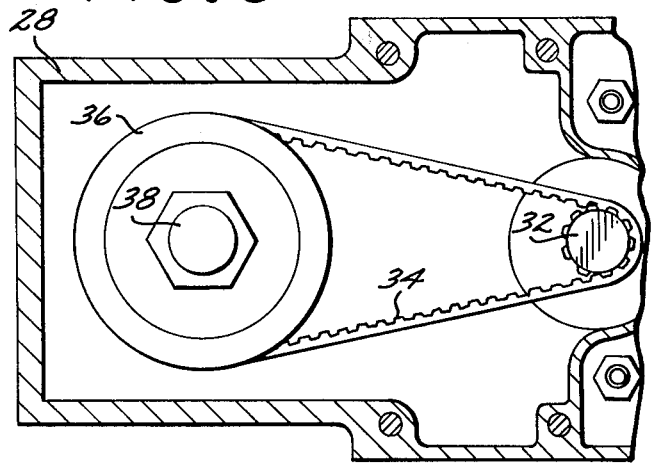
FIG. 6 is a cross-sectional view taken on lines 6,6 of FIG. 3.

The electric motor 30 has an output axle 32, shown on FIG. 6, the rotation of which is reversible. Preferably, the electric motor 30 is a D.C. motor so that its rotation is reversible by reversing the polarity of a current supplying the motor 30. However, the electric motor 30 may also be a reversible A.C. motor, or any reversible motor.

The output of the electric motor 30 is transmitted by a suitable timing belt 34 or the like, to a pulley 36 fixedly attached to a rotatable shaft 38 of a lead screw-threaded sleeve assembly 40. The lead screw-threaded sleeve assembly 40 is a device which moves the electrode 22 up or down depending on the direction of rotation of the output axle 32 of the electric motor 30. Stated differently, the lead screw-threaded sleeve assembly 40 converts the rotary motion of the electric motor 30 to lineal motion of the electrode 22 along the direction of the longitudinal axis of a lead screw 42.

Referring now principally to FIGS. 2, 3 and 4, the lead screw-threaded sleeve assembly 40 is shown to include the lead screw 42, which has a substantially smooth portion 44 rotatably mounted in a suitable bearing 46. The bearing 46 is disposed in the housing 28. The pulley 36, driven by the timing belt 34, is disposed above the bearing 46. A locknut 48 is shown above the pulley 36 on the threaded upper end of the shaft 38 of the lead screw 42.

The shaft 38 of the lead screw 42 is threaded below the bearing 46, and a sleeve 52 is threadedly mounted upon the shaft 38. A substantially cylindrical depression 56 is located on a lower surface 58 of the housing 28 around the area where the rotatable shaft 38 of the lead screw 42 exits from the bearing 46. This is shown on FIG. 2. A hollow cylindrical cover tube 60 is inserted into the depression 56, and is held therein in a fixed, nonrotatable manner by a plurality of lugs 62 which engage matching notches 64 in the tube 60. Four (4) rods 66 are mounted into the housing 28 to engage interior bosses 68 of the cover tube 60. A lower end 70 of the tube 60 rests on an additional lower piece 72 of the housing 28 which also receives the lower ends of rods 66. Conventional nuts 74 which affix the rods 66 to the lower housing piece 72 are shown on the side views of FIGS. 7 and 8.

The threaded sleeve 52 incorporates a flange 76 which has appropriately positioned notches 78 to receive the rods 66 so that neither the cover tube 60, nor the lower housing piece 72, nor the sleeve 52 are capable of rotation relative to the housing 28. The lower housing piece 72, however, includes a circular aperture to allow the sleeve 52 to move longitudinally relative to the rigidly held lower housing piece 72. In the herein-described preferred embodiment the interior (not shown) of the aperture of the housing piece 72 is lined with a low friction plastic bearing (not shown). A threaded bolt 80 is attached to the lowermost part of the sleeve 52. The purpose of the threaded bolt 80 is to permit mounting of the welding electrode 22 through a suitable mounting racket 82 and a nut 84.

It should be readily apparent from the above description that rotation of the electric motor 30 causes the sleeve 52 to linearly move downwards or upwards relative to the housing 28, the direction of the movement being dependent upon the direction of rotation of the output axle 32 of the motor 30. The hereinbefore-described lead screw-threaded sleeve assembly 40 substantially corresponds to a device which is customarily termed "electric cylinder" in the art.

As a principal novel feature of the present invention, and in sharp contrast with the prior art, the lead screw-sleeve assembly 40 (or electric cylinder) of the present invention is "self-limiting" in its downward movement. In other words, it automatically discontinues downward movement of the sleeve 52 (and therefore of the electrode 22 as well) as soon as the electrode 22 encounters a physical obstruction (such as the workpiece 26) in its downward path. To this end, and with particular reference to FIGS. 3 and 4, the smooth portion 44 of the shaft 38 of the lead screw 42 does not terminate immediately below the bearing 46. Instead, the smooth portion 44 continues for a predetermined, albeit short, distance below the bearing 46. A shoulder or flange 86 is provided on the shaft 38 where the smooth portion 44 ends and the threads of the shaft 38 begin.

As a result of the above-described arrangement and structure, the shaft 38 is capable of a limited axial sliding movement relative to the bearing 46 or housing 28. As is apparent from FIG. 4, the shaft 38 is capable of moving upward relative to the bearing 46 until the shoulder 86 engages the bearing 46.

Referring still principally to FIGS. 3 and 4, a spring loaded cam follower rod 88 is shown disposed in the housing 28 with an end 90 resting in contact with an upper end 92 of the shaft 88. The cam follower rod 88 is capable of moving in an upwardly direction against its spring bias to follow the shaft 38 when the shaft 38 slides upwardly in the bearing 46. Preferably, rotation of the cam follower rod 88 is prevented by a transversely disposed pin 93. This is respectively shown in FIGS. 3 and 4.

An electric switch 94, preferably a microswitch, is fixedly mounted to the housing 28 to be disposed just above the protruding upper end 96 of the cam follower rod 88. The microswitch 94 is connected to an electronic control unit 98 which is schematically illustrated on FIG. 1.

The function of the microswitch 94 is to send an appropriate electric signal to the control unit 98 when the microswitch 94 is tripped by the upwardly moving cam follower rod 88. Description of the structure of the control unit 98 is not deemed necessary here, since such a unit may be built in accordance with standard practice in the art to accomplish the hereinafter-detailed functions. A control unit 98 capable of accomplishing the hereinafter-detailed functions, particularly adapted for use in conjunction with the present invention, and having certain novel features as well, is described in a copending application for United States patent by the same inventor as the present application and assigned to the same assignee. The subject matter of the aforesaid copending application bearing attorney docket No. 1900 is hereby expressly incorporated by reference.

Thus, the improved welding apparatus 20 of the present invention operates in the following manner. Initially, the electrode 22 is positioned remotely from the workpiece 26. When an operator (not shown) desires to initiate the welding process, he activates (e.g., by pressing an appropriate button) the control unit 98. Thereupon, the control unit 98 energizes the electric motor 30 to rotate in an appropriate direction to drive the lead screw-sleeve assembly 40 and the electrode 22 therewith, towards the workpiece 26. In this stage of the operation, the shaft 38 is usually gravity biased to occupy its first position shown on FIG. 3, wherein the shoulder 86 is disposed at the predetermined distance below the bearing 46. The first position of the shaft 38 corresponds to the position of the welding apparatus 20 shown on FIG. 7, wherein the electrode 22 is not in contact with the workpiece 28.

The gravity bias of the shaft 38 to occupy its first position relative to the bearing 46 and relative to the microswitch 94 is further aided by the spring bias of the spring bearing cam rod 88. The spring 100, which biases the cam rod 88, may be made sufficiently strong to bias the shaft 38 into its first position even when not aided by gravity. This is necessary, for example, in a situation wherein the electrode 22 is moved in a substantially horizontal direction.

In the instant when the electrode 22 in its movement towards the workpiece 26 physically contacts the solid workpiece 26, the electric motor 30 momentarily continues to drive the lead screw sleeve assembly 40 towards the workpiece 26. However, in this situation (shown on FIG. 8) the electrode 20 and the sleeve 52 are no longer capable of further moving towards the workpiece 26. Therefore, under the continuing power of the motor 30, the shaft 38 moves upwardly, sliding in the bearing 46. The uppermost extreme position of the shaft 38 relative to the bearing 46 is shown on FIG. 4.

As the shaft 38 moves upward in the bearing 46, the cam rod 88 is likewise pushed upward to trip the microswitch 94. As is apparent from the foregoing, the above-described events occur very rapidly and therefore the microswitch 94 is tripped substantially in the same instant when the electrode 22 physically contacts the workpiece 28. Tripping of the microswitch 94 sends an appropriate signal to the control unit 98 and establishes an important reference point for the further functioning of the control unit 98. Upon receipt of the signal from the tripped microswitch 94, the control unit 98 causes the electric motor 30 to reverse rotation for a predetermined time period, thereby removing the electrode 22 a predetermined distance from the workpiece 26. In accordance with standard practice in the art, the welding arc (not shown) is initiated by application of voltage only when the electrode reached the predetermined distance from the workpiece 26. The control unit 98 may be set to apply voltage to initiate the arc automatically. Alternatively, the control unit 98 may merely set the distance between the electrode 22 and the workpiece 26 in the above-described manner, and initiation of the arc may require further action (such as pressing of a button) by an operator (not shown).

A principal advantage of the welding apparatus 20 of the present invention is that setting of the predetermined distance between the electrode 22 and the workpiece 26 is reliable and accurate. It is not disturbed or affected by commonly occurring variations in electrical resistance or impedance between the electrode 22 and the workpiece 26.

Several modifications of the improved welding apparatus of the present invention may become apparent to those skilled in the art in light of the above disclosure. Therefore, the scope of the present invention should be interpreted solely from the following claims.

What is claimed is:

1. A welding apparatus comprising:
   first means adapted for carrying an electrode operatively connected to a power source capable of generating a welding arc between the electrode and a workpiece, in either direction towards or away from the workpiece;
   motor means operatively connected with the first means for providing motive power to the first means, the motor means being controllable to move the first means to carry the electrode towards the workpiece, and alternatively to move the first means to carry the electrode away from the workpiece;
   sensing and control means including switch means operatively associated with the first means for causing the first means to trip the switch means substantially when the electrode physically contacts a solid body such as a workpiece, and for causing the motor means to reverse movement of the first means for a predetermined time period, whereby after the electrode contacts the workpiece the electrode is carried away by the first means to a predetermined distance from the workpiece; and housing means relative to which the motor means are fixedly mounted, and wherein the first means comprise a lead screw and threaded sleeve assembly, the lead screw being rotatably mounted in a bearing incorporated in the housing means and being mechanically connected to the motor to be driven thereby, the threaded sleeve being mounted on the lead screw to move longitudinally relative to the lead screw when said lead screw is rotated, the threaded sleeve being adapted for carrying the electrode, the lead screw having an upper end, the lead screw and the bearing comprising means for allowing the upper end of the lead screw to move in a direction opposite to the motion of the threaded sleeve towards the work surface and therethrough for tripping the switch means.

2. The apparatus of claim 1 wherein the housing further includes biasing means for biasing the lead screw into a position wherein the upper end of the lead screw normally does not transmit force to trip the switch means.

3. The apparatus of claim 2 further comprising an intermediate member incorporated into the housing, and comprising part of the biasing means, said intermediate member transmitting force from the upper end of the lead screw to directly trip the switch means.

4. The apparatus of claim 1 wherein the lead screw includes a portion held in the bearing and a shoulder provided on the lead screw a predetermined distance below the bearing, the lead screw being capable of a motion in the direction opposite to the motion of the threaded sleeve towards the work surface, the extent of said opposite motion being determined by the predetermined distance.

5. The apparatus of claim 4 wherein the lead screw is connected to the motor means by a timing belt.

6. An apparatus adapted for bringing a welding electrode into contact with a work surface and for thereafter removing the electrode a first predetermined distance from the work surface, said apparatus comprising:

an electric motor capable of providing a rotational power output in either direction;

control means including switch means for controlling the direction of the rotational power output of the electric motor;

a housing relative to which the electric motor is fixedly mounted;

a lead screw and threaded sleeve assembly, the lead screw being rotatably mounted in a bearing which is included in the housing and being mechanically connected to the electric motor to be rotated thereby in either direction, the threaded sleeve being threadedly mounted on the lead screw to move longitudinally thereon as the lead screw is rotated, the threaded sleeve being adapted for carrying the electrode in a first direction towards the work surface and in a second direction away from the work surface, the first and second directions being dependent on the direction of rotation of the electric motor, the lead screw comprising means for moving a second predetermined distance relative to the housing when the electrode is being carried in the first direction and the electrode physically contacts the work surface, and for tripping the switch means whereby the direction of rotational power output of the electric motor is reversed by the control means and the electrode is carried in the second direction.

7. The apparatus of claim 6 wherein the control means are adapted for energizing for a predetermined time the electric motor after the switch means are tripped so that the electrode is carried to the first predetermined distance away from the work surface.

8. The apparatus of claim 7 wherein the lead screw has a portion mounted in the bearing and capable of sliding a limited distance in the bearing in an axial direction, the lead screw sliding in the bearing the limited distance to trip the switch means.

9. The apparatus of claim 8 further comprising biasing means incorporated in the housing and operatively connected with the lead screw for normally biasing the lead screw into a position wherein the switch means are not tripped.

10. The apparatus of claim 9 wherein the lead screw further comprises a shoulder located a predetermined distance below the bearing, the lead screw capable of sliding in the bearing up to a point where the shoulder engages the bearing.

11. The apparatus of claim 6 wherein the electric motor is a DC motor.

12. The apparatus of claim 6 wherein the lead screw is connected to the electric motor through a timing belt.

13. In an apparatus adapted for carrying a welding electrode into contact with a work surface and thereafter removing the electrode from the work surface to a predetermined distance, the apparatus including a housing, motor means fixedly mounted relative to the housing for providing rotary power in either direction of rotation, translatory motion means mounted to the housing and adapted for carrying the electrode towards or away relative to the work surface depending on the direction of rotation of the motor means and driven thereby, sensing means for sensing when the electrode is substantially in contact with the work surface and for reversing the rotational direction of the motor means thereby causing the translatory motion means to carry the electrode a predetermined distance away from the work surface, the improvement comprising:

means operative associated with the translatory motion means for mechanically tripping an electric switch when the electrode contacts the work surface during travel of the translatory motion means toward the work surface, said electric switch being part of the sensing means; and said translatory motion means comprising a lead screw and threaded sleeve assembly, the lead screw being mounted in the housing for rotation relative thereto and for limited axial sliding motion relative thereto, the threaded sleeve being mounted on the lead screw to move up and down thereon depending on the direction of rotation of the lead screw, the threaded sleeve carrying the electrode, the lead screw being capable of sliding relative to the housing and of causing the electric switch to trip.

14. The improvement of claim 13 wherein the lead screw includes a substantially cylindrical shaft portion mounted in a bearing which is included in the housing, and wherein the lead screw further includes a shoulder disposed at a predetermined distance below the bearing, the lead screw being capable of sliding in the bearing until the shoulder engages the bearing.

15. The improvement of claim 14 wherein the housing further includes biasing means for normally biasing the lead screw into a position wherein the shoulder is disposed remotely from the bearing.

16. The improvement of claim 15 wherein the biasing means include a spring bearing cam shaft directly in contact with an upper portion of the lead screw, the spring bearing cam shaft tripping the electric switch when the lead screw slides upwardly in the bearing.

17. In an apparatus for carrying a welding electrode into contact with a work surface and thereafter removing the welding electrode to a predetermined distance from the work surface, the apparatus including a housing, a reversible electric motor fixedly mounted relative to the housing, a lead screwthreaded sleeve assembly driven by the electric motor and carrying the electrode either towards the work surface or away from the work surface depending on the direction of rotation of the electric motor, the lead screw being rotatably mounted in a bearing incorporated in the housing, the improvement comprising:

a relatively smooth nonthreaded shaft portion of the lead screw partly incorporated in the bearing and having a shoulder disposed at a predetermined distance below the bearing whereby the lead screw is capable of axially sliding in the bearing until the shoulder engages the bearing, and electric switch means operatively mounted to the housing for being tripped when the lead screw slides axially upwardly in the bearing and for reversing the rotation of the electric motor from a direction wherein the electric motor through the lead screw-threaded sleeve assembly drives the electrode towards the work surface into a direction wherein the electric motor moves the electrode away from the work surface, whereby, after the electrode physically contacts the work surface, the lead screws slides upward, trips the switch means and the electrode backs away a predetermined distance from the work surface.

18. The improvement of claim 17 wherein the lead screw is connected to the electric motor through a timing belt.

19. The improvement of claim 17 wherein the electric motor is a DC motor.

20. The improvement of claim 17 further comprising biasing means incorporated in the housing for normally biasing the lead screw into a position wherein the shoulder is remote from the bearing.

21. The improvement of claim 20 wherein the biasing means includes a spring bearing cam follower shaft in contact with an upper portion of the lead screw, said cam follower shaft following the lead screw when the lead screw slides upwardly in the bearing, and directly tripping the switch means.

* * * * *